Aug. 14, 1945.  B. LEUVELINK  2,382,428
CLAMPING DEVICE
Filed April 22, 1944  2 Sheets-Sheet 1

INVENTOR
B. LEUVELINK
BY
Walter C. Kiesel
ATTORNEY

Aug. 14, 1945.      B. LEUVELINK      2,382,428
CLAMPING DEVICE
Filed April 22, 1944      2 Sheets-Sheet 2

INVENTOR
B. LEUVELINK
BY
Walter E. Kiesel
ATTORNEY

Patented Aug. 14, 1945

2,382,428

UNITED STATES PATENT OFFICE 2,382,428

CLAMPING DEVICE

Bernard Leuvelink, Morristown, N. J., assignor to Bell Telephone Laboratories, Incorporated, New York, N. Y., a corporation of New York Application April 22, 1944, Serial No. 532,293

11 Claims. (Cl. 248—361)

This invention relates to clamping devices and more particularly to such devices for detachable electrical units subjected to vibrations and shocks under operating conditions.

In mobile radio equipment, for example, there are numerous push type units, such as metal and glass electron discharge devices, coils, condensers and crystals, mounted in sockets on a base with other associated parts to constitute the circuit elements of radio transmitting or receiving communicating systems. These units are extremely sensitive to vibration and shock which deleteriously affect their internal construction or their connection in the socket in which they are mounted. Such extraneous effects have been alleviated to some extent by locking the unit close to the base to offset dislocation and oscillation due to shock or vibration.

However, in such equipment, particularly in complicated systems, the units are mounted in compact relation to other elements so that the congested conditions do not readily permit servicing or testing of the units due to the difficulty of reaching and manipulating the locking elements without special tools or consuming considerable time in releasing the locks to interchange the units. Furthermore, such base locks are impotent against vibration or shock striking the top of the unit which is exposed above the locking arrangement.

The primary object of this invention is to increase the stability of the complete unit mounted in the socket so that the assembly is non-resonant over the whole length of the unit whereby shock and vibration do not affect the operation of the unit.

Another object of the invention is to facilitate the mounting and servicing of the unit without the use of tools.

A further object of the invention is to stabilize the unit in congested surroundings where close association with cooperating apparatus renders it difficult to test and service the unit.

Another object of the invention is to render the stabilizing means readily accessible at the top of the unit where it may be easily operated by hand.

A further object of the invention is to increase efficiency by the interchangeability of the stabilizing means so that it may be applied to a majority of units employed in radio equipment.

Still further objects of the invention are to prevent grounding of the shell of the unit and to render the movable part captive so that it is not lost or misplaced.

These objects are attained in accordance with this invention by mounting the electrical device or unit rigidly in the socket by means of a retainer locking or clamping device which engages the top of the unit and also a pair of parallel guide posts extending on opposite sides of the unit, the locking device having means frictionally bearing against the guide posts to wedge the locking device against the unit so that a compression force is exerted on the unit to maintain it in the socket. The unit is therefore protected against shock and vibration imparted laterally or axially toward the unit and the unit is securely locked in stable relation to other cooperating equipment associated therewith.

More specifically the invention relates to a readily adjustable retainer adapted to be applied to a metallic or glass-enclosed electron discharge device or vacuum tube which is usually mounted in a push type socket affixed to a base and is easily detached therefrom by pulling from the socket to make replacements. Such devices and other allied apparatus mounted in sockets are susceptible to vibration and shock which deleteriously distort or fracture the internal electrodes or elements, particularly in mobile equipment, where such disorganizing effects are frequently prevalent. If the vibration is insufficient to seriously affect the internal elements it nevertheless may eventually loosen the tube in the socket to such an extent that the circuit connections are disrupted or introduce high impedance to the currents in the circuit and thereby reduce the efficient operation of the system.

These disadvantages are overcome by locking the tube securely in the socket by a clutch type cover member or ring which engages the top or shoulder of the tube and frictionally embraces a pair of rigid posts extending on opposite sides of the tube from the base or socket mounting. The cover member is provided with a resilient element which is secured to the top thereof and provided with apertured ends which slide along the posts and are flexed in tangential relation to the cover member to grip the posts in a wedging action when the cover member bears against the top of the tube. The tube is rigidly secured in the socket and is guarded against vibration or shock loosening it therefrom.

A particular advantage of this construction is the facility with which the retainer may be manipulated to service or test the equipment since it is easily accessible at the top of the tube. This is especially desirable where a large number of tubes are employed in a compact assembly.

Another feature of the invention is that the retainer may be assembled and dismantled without the use of tools since the several parts may be affixed by hand. This is a distinct asset when installation is necessary in the field or in an emergency to overcome vibration.

Another feature of the retainer is the interchangeable character of its construction since it may be applied to various configurations and sizes of tubes without alteration.

Further features of the invention relate to the mounting of the retainer with respect to metallic units so that grounding of the unit is prevented. The compression element of the retainer is formed of dielectric material so that the base or mounting plate is insulated from the unit and the element. The compression element also has cushion characteristics when engaging the metal surface of the unit whereby slight yieldability is attained in the clamping operation. The element also may be rendered captive on one of the posts adjacent the unit to prevent its loss when released. The retainer may also include a shield or electrostatic housing member enclosing the unit which is coupled to the retainer to effect the complete protection of the unit from electrical and mechanical extraneous disturbances.

These and other features and advantages of the invention will be more clearly ascertained from the following detailed description when considered with the accompanying drawings.

Figure 1:
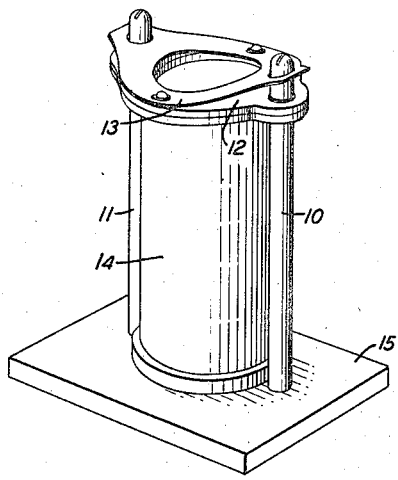
Fig. 1 is a perspective view of a device embodying the invention as applied to a metallic enclosure electron discharge device in which the compression element engages the top of the device.

Referring to the drawings and particularly to Fig. 1, the clamping device or retainer of this invention is illustrated in combination with an electron discharge device or vacuum tube which is usually detachably mounted in a socket of the push-type for electrically coupling the internal electrodes or elements of the tube to associated apparatus involved, for example, in an amplifier or radio set. Of course, the clamp or retainer is not limited to this specific application, since it may be employed with many other devices, such as, coils, condensers, crystal units, filters and photoelectric cells which are included in communicating circuits and systems and other equipment such as relays and transformers, used in electrical translating and converting systems where such equipment is usually detachable and replaceable by the socket coupling.

The nature of the mounting of the unit or device in the socket and particularly the delicate internal electrodes of the device render the device susceptible to vibration or shock, especially in mobile carriers, ei her on land, on or under the sea or in the air, which endanger the efficient operation of the device or seriously damage the internal elements. The deleterious effects of shock and vibration may be materially diminished or completely elimintaed locally by rigidly securing the tube or unit in the socket mounting by an efficient clamp or lock which is easily accessible, preferably hand operated and formed of simple construction. These attributes are attained by the concepts of this invention and in addition fulfill other desirable requisites which render the retainer highly desirable and efficient either for initial installation or subsequent application in the field.

Figure 2:
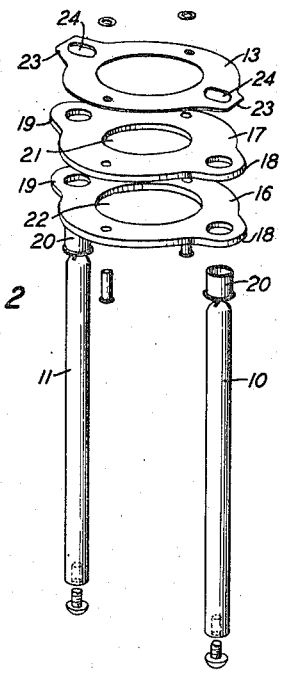
Fig. 2 is a perspective view of the retainer components in which the compression member is shown in exploded fashion to more clearly illustrate the details of the assembly.

As shown in Figs. 1 and 2, the clamping device embodies a pair of parallel side members, guide rods or posts 10 and 11, a compression element or cover member 12, and a resilient wedge member or clutch ring 13 which is slightly deformed when in operating position on the guide rods. In Fig. 1 the device is illustrated in combination with a metal-type vacuum tube 14 which is detachably mounted in a socket (not shown) affixed to a base plate 15. The metal tube 14 may be of the "MT8" type which has a top surface of generally rounded contour and a uniform cylindrical surface so that the compression element 12 bears against the top of the tube and posts 10 and 11 extend laterally on opposite sides of the tube and are secured to the base plate in the same holes used for mounting the socket of the assembly. The posts may be secured in position without special tools since only a screwdriver or pliers is necessary for tightening the posts or in an emergency they may be easily affixed by hand operation.

The compression element 12 is preferably formed of insulating material, such as fiber or plastic, to eliminate grounding of the tube to the base plate or in some instances where slight yieldability is desirable and heating effect is of negligible consequence, the element may be formed of molded rubber or similar composition. In the specific illustration of Figs. 1 and 2, the element 12 is preferably formed of two punched discs or plates 16 and 17 of a fiber-glass phenolic composition, to withstand temperatures as high as 300° F., so that deterioration is avoided when in contact with a tube which dissipates considerable heat energy.

The plates are provided with apertured ear portions 18 and 19 in oppositely disposed relation and the discs are secured together in layer fashion by eyelets 20. The eyeleted apertures are suitably dimensioned to coincide with the upright posts 10 and 11 and the element is slidably guided on the posts. The top disc 17 may also be provided with a central opening 21 and disc 16 is preferably formed with the similar opening 22 of slightly larger diameter to form a graded inner shoulder which readily conforms to the contour of the top surface of tube 14 and converts the element into a ring-like member which is only slightly larger than the tube diameter.

Figure 4:
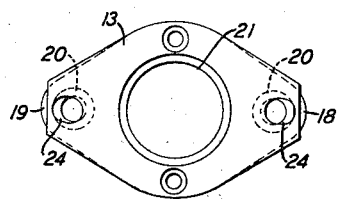
Fig. 4 is an enlarged plan view of the compression element according to this invention showing the eccentric relation of the apertures in the flexible and rigid ring members thereof.
Figure 5:
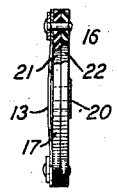
Fig. 5 is a side view partly in cross-section of the compression element shown in Fig. 4.

The compression element also carries a resilient clutch ring 13, for example of phosphor bronze or steel, which may be punched from flat spring material, the ring being secured to the compression element by rivets at diametrically opposite points perpendicular to the positions of the guiding apertures in the ear portions 18 and 19. The free portions of the ring 13 are provided with rectangular projections 23 and each projection has an oval-shaped aperture 24 which, as shown in Fig. 4, slightly overlaps the inside circumference of the apertures in the compression element, while the opposite end of the aperture 24 extends beyond the outer circumference of the aperture in the compression element 12. The eccentricity of these apertures in the clutch ring and the compression element produces the locking feature of the assembly in accordance with this invention.

While the clutch spring ring 13 is normally substantially parallel to the upper face of the compression element when dissociated from the guide rods, it will be seen from Fig. 1 that as the retainer is applied to the tube 14, the apertured ear portions 18 and 19 slide along the rods 10 and 11 until the shoulder of the ring 12 engages the curved contour of the top of the tube. Since the apertures 24 in the clutch ring are spaced at a slightly greater diameter than the posts the free portions of the ring 13 will be angularly distorted with respect to the compression element until the apertures 24 coincide with the posts and the spring ring will assume this position until pressure is relieved on the element 12 which bears against the top of the tube. The distorted portions of the clutch ring being resilient will exert a pressure toward the element 12 and the compression member will exert a counter-acting pressure against the clutch ring so that the two forces cause the inner edges of the apertures 24 to be wedged against the inner surfaces of the guide rods to securely maintain the retainer in locked position in the mounting. The retainer is readily released by hand simply by further distortion of the clutch ring to raise the ears by grasping the flat ends of the spring exterior to the posts. The oval apertures permit limited movement of the distorted ends of the ring to release pressure on the inner surfaces of the posts and the retainer may be slidably removed therefrom so that the tube may be replaced or suitable tests performed.

This construction sufficiently anchors or locks the tube in the socket and the retainer is conveniently located at the top of the assembly where it is easily accessible for application to or removal from the tube. This is a particular advantage in congested locations where it is not possible to reach the base plate without special tools. Furthermore, the complete tube is adequately protected from shock and vibration since it is rigidly fixed in the socket and is not liable to be shaken or disconnected from the socket. Other advantages inherent in this construction are the facility with which the retainer and the posts may be assembled without special tools since a screwdriver is sufficient to secure the posts in position, while other manipulations may be performed by hand and the compression element is formed of insulating material having high dielectric and heat resisting properties so that a metal tube is not grounded to the base plate and is not affected by heat radiation from the tube. Moreover, the assembly does not substantially increase the mounting space of the tube and the posts may be affixed to the base plate in the same holes for mounting the socket.

Figure 3:
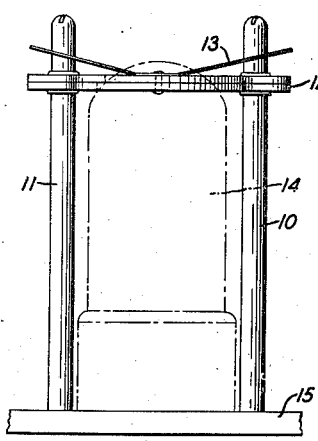
Fig. 3 shows the same construction of the device as in Fig. 1 in a front elevation view as applied to a discharge device of the glass enclosure type.
Figure 6:
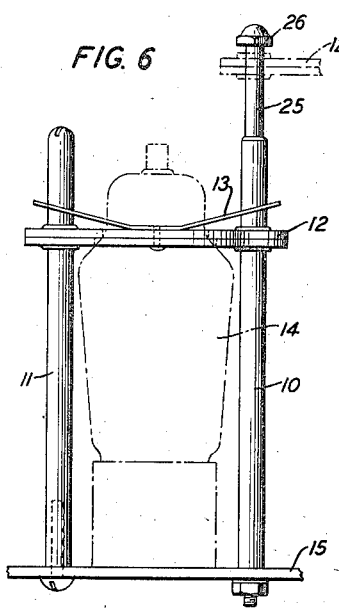
Fig. 6 is another elevation view of the device of this invention applied to a discharge device having a dome type bulb and also including means on one of the posts for preventing the loss of the compression element.

Another feature of this retainer is its interchangeability since it may be applied to short tubes, glass enclosure tubes, as shown in Fig. 3, dome type tubes as shown in Fig. 6 where the stepped ring member 12 is in contact with the shoulder of the glass envelope and various other types without alterations if the spacing of the posts conform to the diametrical spacing of the apertures in the retainer.

A modification of the invention is shown in Fig. 6 which renders the retainer captive so that loss is prevented and the locking ring cannot be displaced. In this arrangement the post 10 is provided with an extension 25 which is terminated by an enlargement 26, such as a lock nut, so that after the retainer is released from the tube, it is swung to one side on the extension and suitable interchange of the tube is made in the socket.

Figure 7:
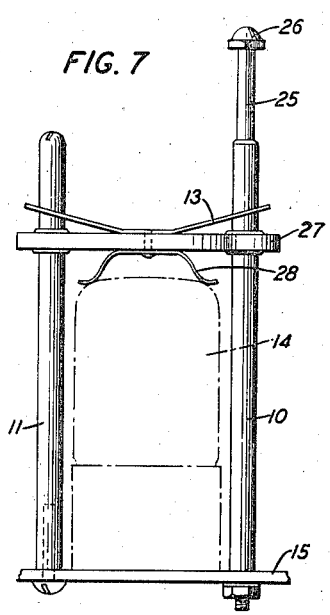
Fig. 7 shows a modified assembly in which an auxiliary spring member is interposed between the compression element and the device clamped in the mounting.

Another modification is shown in Fig. 7 which may be desirable in some instances where rigidity is not essential yet the tube must be securely locked in position. This construction employs a punched disc or plate 27 of any suitable rigid material, for example, metal or insulation, which need not be provided with the central opening to form a shoulder ring. The plate is applied to the guide rods in the same manner as heretofore described and carries the clutch ring 13 on the top thereof while a U-shaped spring member 28 having curved ends is secured to the lower surface at a central point. The spring member is, therefore, interposed between the plate and the tube 14 and exerts a yielding pressure on the top of the tube.

Figure 8:
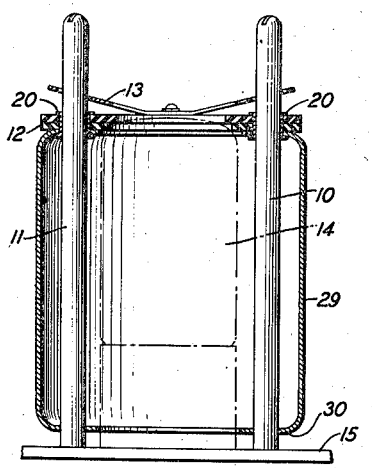
Fig. 8 illustrates in a cross-section view a further modification of the invention in which the retainer includes an electrostatic shielding enclosure which surrounds the device.

Fig. 8 shows a modified assembly in which an electrostatic metallic enclosure is combined with the retainer to shield the tube from magnetic fields exterior to the tube. The retainer is affixed to the guide posts in the same manner as described in connection with Fig. 1 but includes a cylindrical metallic casing 29 which is affixed to the lower surface of the compression element 12, preferably by the eyelets 20 securing the multiple discs together, and is guided on the posts by openings in a lower turned portion 30 of the casing although the same shielding effect may be accomplished by an alternative construction of the casing to fit close to the mounting plate 15.

Figure 9:
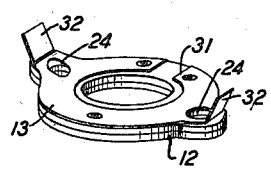
Figs. 9 and 10 show different forms of the compression element in perspective view which may be employed with the assembly in the other figures.
Figure 10:
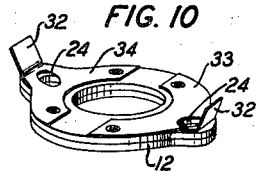

The clutch ring 13 on the compression element being metallic, it might in some applications be subjected to high frequency heating currents which would impair the resilient properties of the ring. This difficulty may be avoided by inhibiting the heating of the ring 13, as shown in Fig. 9, by disrupting the continuous configuration of the ring. A portion is removed to form a slot 31 and the disjointed ends are affixed to the ring 12 by rivets while the oppositely disposed portion is similarly secured to the ring 12. The clutch ring may also be provided with upturned ears 32 in line with the oval-shaped apertures 24 to increase the leverage in releasing the ring from the guide posts by hand. The same advantage may be secured, as shown in Fig. 10, by forming the clutch ring 12 of two semi-circular portions 33 and 34 which are spaced in suitable relation on the compression ring member 12 and affixed thereto by rivets.

While the invention has been disclosed in its several embodiments involving specific constructions, it is, of course, understood that various modifications may be made in the detailed assembly of the lock or retainer without departing

What is claimed is:

1. A retainer device for a detachable electron discharge tube having a shoulder portion mounted in a socket, which comprises a pair of metallic members extending in parallel relation on opposite sides of said tube, a ring member engaging said shoulder, and means frictionally coupling said ring to said members to exert a compression force on said tube in said socket.

2. A clamping device for a detachable electrical unit mounted in a socket, which comprises a pair of rigidly mounted members extending on opposite sides of said unit, a compression element bearing on the top of said unit having a spring affixed thereto for frictionally engaging said members to lock said unit in said socket, and means on one of said members preventing the loss of said compression element.

3. A clamping device for a detachable electrical unit mounted in a socket, which comprises a pair of members extending on opposite sides of said unit, a compression element frictionally engaging said members, and an auxiliary resilient member carried by said compression element and bearing against the top of said device.

4. A clamping device for a detachable electrical unit mounted in a socket, which comprises a pair of rigid metallic members extending on opposite sides of said unit, a compression element bearing on the top of said unit and slidably supported on said rigid members, and frictional engaging means on said element embracing said metallic members.

5. A clamping device for a detachable electrical unit mounted in a socket, which comprises a pair of rigid posts extending on opposite sides of said unit, a compression element bearing on the top of said unit and disposed between said posts, and a leaf spring member carried by said element disposed in tangential relation thereto for clamping said element to said unit by frictional contact with said posts.

6. A combined clamping device and shield for a detachable electrical unit mounted in a socket, which comprises a pair of rigid posts extending on opposite sides of said unit, a compression element bearing on the top of said unit and frictionally engaging said member to lock said unit in said socket, and a metallic casing enclosing said unit and supported by said compression element.

7. A mounting for an electrical device, comprising a pair of posts extending in parallel relation on opposite sides of the device, a rigid ring member slidably adjustable on said posts and engaging a portion of the top of said device, and a flexible ring member secured to said rigid ring and having apertured end portions frictionally engaging said posts in angular relation to said rigid ring to lock said rigid ring in pressure relation on said device.

8. A clamping device for a detachable electron discharge tube mounted in a socket, which comprises a pair of rigid posts extending on opposite sides of said tube, a ring member of insulating material having high dielectric properties bearing against the top of said tube, said member having opposed apertured portions slidably fitting over said posts, and a resilient ring secured to said ring member at diametrically opposed points thereon, the free portions of said ring being flexed away from said insulating ring member and having wedging action against the inner surfaces of said posts to lock said insulating ring member against the top of said tube.

9. A retainer for a detachable vacuum tube mounted in a socket, which comprises a pair of rigid posts extending on opposite sides of said tube, a rigid insulating ring member bearing against the top of said tube and having guide portions slidably fitting over said posts, and a resilient split ring above said insulating member having the ends secured to said member and the intermediate point likewise secured thereto, the remaining oppositely disposed portions having ears with apertures slightly misaligned with respect to said guide portions of said insulating member.

10. A vacuum tube retainer, comprising a pair of posts adapted to be mounted on opposite sides of the tube in parallel relation, a rigid insulating ring for engaging the top of the tube and slidably adjustable on said posts, and a flat spring ring attached to said insulating ring across one diameter, the intermediate portions having upturned ears and openings adjacent thereto eccentric to the apertures in said rigid ring, said openings and apertures being adapted to be aligned on said posts with said flat ring flexed angularly from said rigid ring and said openings wedged against the inner surfaces of said posts.

11. A vacuum tube retainer, comprising a pair of rigid guide posts extending on opposite sides of said tube, an oval-shaped insulating ring of multiple layers having central openings of different diameters to form a graded shoulder adapted to engage rounded contours and oppositely disposed apertured end portions, metallic eyelets projecting through said end portions and securing said layers together, and a resilient flat ring mounted on the upper layer and secured thereto across the short dimension of said oval ring, said flat ring having apertured flexing portions adapted to engage the inner surfaces of said posts and wedge said insulating ring against the top of said tube.

BERNARD LEUVELINK.